Nov. 12, 1935.  C. E. COTTINGHAM  2,020,299
CHURN DASHER
Filed Nov. 22, 1934
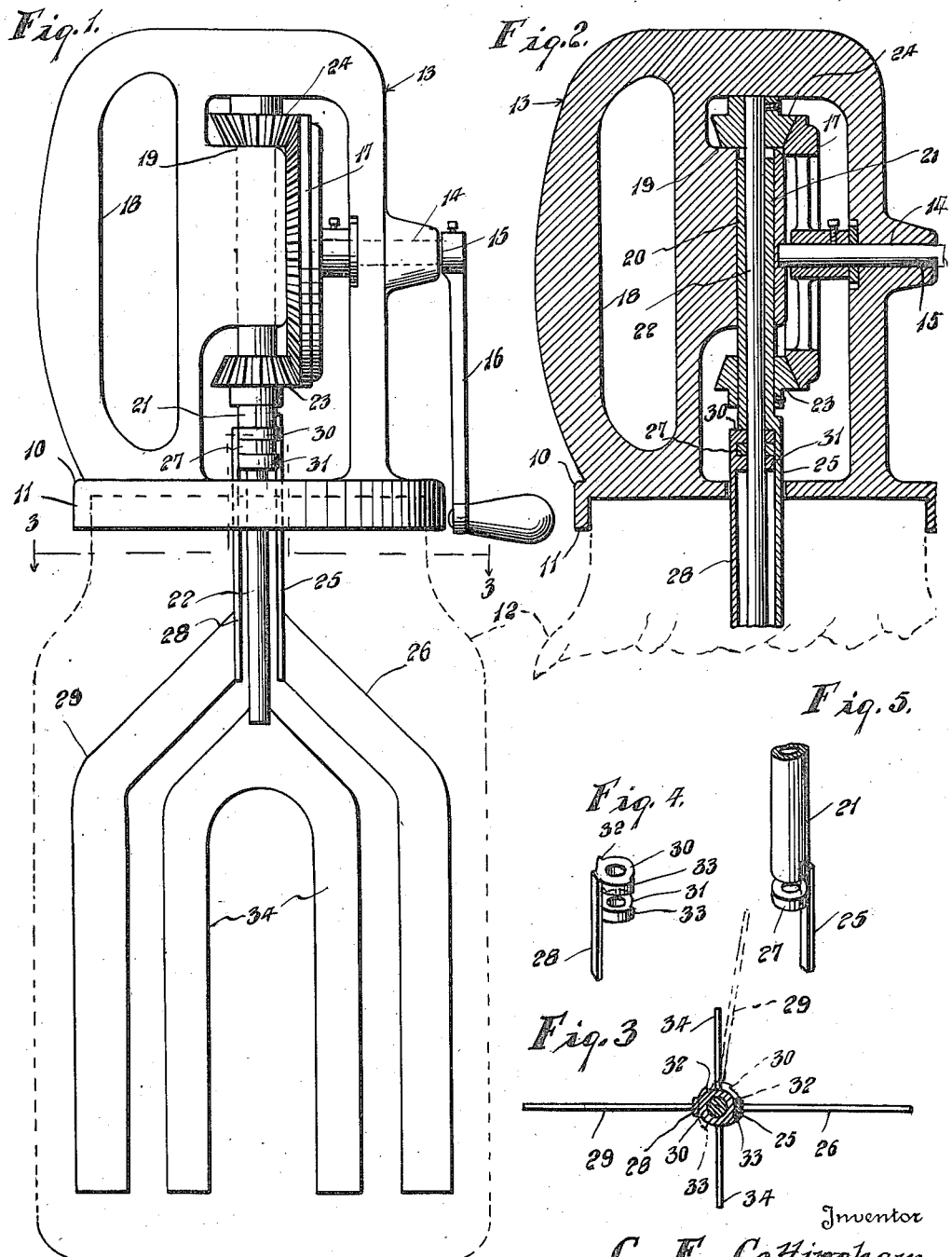

Patented Nov. 12, 1935

2,020,299

UNITED STATES PATENT OFFICE 2,020,299

CHURN DASHER

Charles E. Cottingham, Aurora, Mo.

Application November 22, 1934, Serial No. 754,342

2 Claims. (Cl. 259—105)

The invention relates to churn dashers and particularly to the type in which two telescoping shafts are driven in opposite directions by means of suitable gearing, and has for its object the provision of means whereby the dashers on the outer shaft may be moved on the inner shaft to angular relation to permit insertion of the dashers into a relatively narrow neck structure on the body of the churn, means being provided whereby the dashers on the outer shaft may be driven with the dashers arranged diametrically opposite to one another.

The invention will be described in detail hereinafter and will be found illustrated in the accompanying drawing in which Figure 1 is a view in elevation of the improved churn dasher structure shown in connection with a churn body illustrated in broken lines, Figure 2 is a fragmentary sectional view substantially on a plane parallel with the axis of the drive shaft, Figure 3 is a sectional view through the telescoping shafts showing the churn dashers in plan, and in full lines in driving position, and in broken lines one of the outer dashers arranged in its angular relation to the mating dasher, Figure 4 is a view in perspective of a fragment of one of the dasher carrying rods, and Figure 5 is a similar view of the other dasher carrying rod and its connected tubular shaft.

In the drawing similar reference characters are used to designate corresponding parts throughout the several views.

The improved churn dasher structure comprises a base member 10 that has a circumferential downwardly extending flange 11, said base structure being adapted to seat on the neck of a churn body 12 as shown in Figures 1 and 2.

Supported on the base 10 is an upright frame 13 having a bearing 14 for a drive shaft 15 that may be driven by a crank arm 16 as shown in the drawing, or by any other suitable driving means. Secured to the shaft 15 is a beveled driving gear 17. Frame 13 is provided with a vertically elongated opening 18 that is adapted to be used as a handhold when the churn is in operation when driven by means of the crank arm 16, and a boss 19 providing a bearing 20 for the telescoping shafts 21 and 22.

Secured to the tubular shaft 21 is a beveled gear 23 that meshes with the beveled driving gear 17, and secured to the inner shaft 22 is another bevel gear 24 that is also in mesh with the beveled driving gear 17, the gears 23 and 24 providing means whereby the shafts 21 and 22 are driven in opposite directions.

Extending downwardly from the tubular shaft 21 is a rod 25 on which is secured a churn dasher 26, and spaced below the lower terminal of the tubular shaft 21 and carried by the rod 25 is a sleeve or collar 27. 28 indicates another rod carrying a dasher 29, and having spaced sleeves or collars 30 and 31. Each of said sleeves or collars 30 and 31 are provided with diametrically opposed and outwardly extending shoulders 32 and 33. As shown in the drawing when the shafts 21 and 22 are assembled, the sleeve or collar 30 is rotatably mounted on the shaft 22 between the lower extremity of the tubular shaft 21 and the sleeve or collar 27, and when the shafts 21 and 22 are driven the rod 25 by engaging the shoulders 33 will serve to drive the dashers 26 and 29, the dashers being as shown in full lines in Figure 3 in diametrically opposed relation, and the dashers 34 carried by the shaft 22 will be driven in the opposite direction from the dashers 26 and 29. In order to provide means whereby the dashers may be inserted into a relatively narrow neck churn body as shown at 12, the dashers 26 and 29 may be moved circumferentially toward one another in the opposite direction from the driving section of the dashers into angular relationship as shown in Figure 3, wherein the dasher 29 is shown in broken lines in its angular relationship with the dasher 26. After the dashers have been inserted into the churn body and the drive begun, it will be apparent that the dashers 26 and 29 will automatically assume the position shown in full lines in Figure 3, that is, as above stated, in diametrically opposed relationship.

What is claimed is:—

1. A churn dasher structure, comprising a tubular shaft mounted for rotation, a shaft mounting and telescoping said tubular shaft, a rod secured to said tubular shaft, a disk mounted on said rod and spaced from the end of the tubular shaft, said disk having an opening to receive the second mentioned shaft, another rod, a second disk secured to the second mentioned rod, said second disk having an opening to receive the second mentioned shaft and mounted between the tubular shaft and first mentioned disk and rotatable relatively thereto, and dasher members secured to said rods.

2. A churn dasher structure, comprising dasher members, a rod secured to each of said dasher members, a tubular shaft mounting one of said rods, a shaft telescopically mounting said tubular shaft and having dasher members secured thereto, the other of said rods rotatably mounted on the second mentioned shaft, the second mentioned rod arranged to be driven with the first mentioned rod, means mounting the second rod for movement relatively to the tubular shaft and first rod to position the dashers thereon at an angle to one another for insertion of the dashers into a churn body.

CHARLES E. COTTINGHAM.